DIGITAL SCENE DATA RECORDING AND DISPLAY SYSTEM

Filed Dec. 15, 1966 2 Sheets-Sheet 1

INVENTORS.
ROBERT S. NEISWANDER,
WALTER RHINER,
By Charlton M. Lewis

DIGITAL SCENE DATA RECORDING AND DISPLAY SYSTEM

Filed Dec. 15, 1966 2 Sheets-Sheet 2

INVENTORS.
ROBERT S. NEISWANDER,
WALTER RHINER,

By Charlton M. Lewis

United States Patent Office 3,466,389
Patented Sept. 9, 1969

3,466,389
DIGITAL SCENE DATA RECORDING AND DISPLAY SYSTEM

Robert S. Neiswander, Santa Barbara, and Walter Rhiner, Berkeley, Calif., assignors of The TE Company, Santa Barbara, Calif., a corporation of California Filed Dec. 15, 1966, Ser. No. 602,038
Int. Cl. H04n 5/84; G11b 7/00; H04l 3/00
U.S. Cl. 178—6.7 19 Claims

ABSTRACT OF THE DISCLOSURE

Numerical information associated with a scene, which may be two-dimensional, is recorded in spatial relation corresponding to the scene. The information is recorded in digital form, permitting digital readout. The digital code is so selected that the visual appearance of the record corresponds to the scene, constituting an analog representation from which the numerical information is recoverable visually in at least approximate form. Illustrative apparatus for recording and reading such codes is described, together with illustrative codes, which may be binary or other, and may utilize different colors for respective channels of information.

This invention has to do with recording digital data representing a field of values such as may correspond, for example, to the intensity of radiation, visible or nonvisible, received from an actual object or scene.

A primary object of the invention is to permit recording of such digital data in a manner that presents a grey scale analog representation of the data, suitable for visual display, while also retaining the full digital content, suitable for subsequent digital readout.

The invention is useful, for example, for recording and processing video data from a wide variety of image-dissecting devices, such as an optical scanner or a conventional raster-scanning vidicon or orthicon image tube. The resulting video analog voltage representations of successive flying spot scans of a scene may be converted to digital form in known manner, the analog value for each successive raster element being represented by a distinct numerical value. The advantages of digital representations for such purposes as accurate transmission and computation are well known.

The invention is also useful in connection with two-dimensional fields of variation of any variable quantity that can be visualized in terms of brightness variations in an actual or imaginary scene area. The variable quantity to be recorded may correspond, for example, to temperature at a physical surface, or to electrical potential at a defined geometrical surface in space. Whereas the invention is primarily useful in connection with two-dimensional displays, many of its features apply also to linear displays, which may correspond to linear scenes.

After a scene variable has been converted to digital form in conventional manner it is often desirable to reconstruct a visual display of the original scene, for example to permit visual selection or interpretation of areas that are significant for some particular purpose and that therefore require further specialized processing of the data. If the digital data are recorded conventionally on tape, for example, it is, of course, possible with specialized re-recording means to restore the data to analog form and present it in visible format, for example as a variable density record on photographic film or the like. However, such a variable density record inevitably contains less precise information than the digital record. And reference to the latter is rendered difficult by the indirect correspondence between a selected area of the variable density record and the digital tape.

The present invention permits recording information associated with a two dimensional scene as a two dimensional data array corresponding directly to the scene. The numerical information for each scene element is recorded at the corresponding geometrical element of the record surface, as a definite digital code configuration that is suitable for accurate digital readout. At the same time, by suitable selection of the code, each elementary area of the record acquires a visual appearance, typically a grey scale value, that corresponds closely to the numerical value for that element. Hence the record area itself, although digitally recorded, constitutes in effect a variable density analog presentation of the scene.

Such a digital record can be surveyed directly by visual inspection, for example to reject the uninteresting portions and isolate for further study the interesting areas. Those areas that are selected contain inherently the full digital information in condition for direct readout to a magnetic tape or other format, as for presentation to a computer for additional processing.

The record area typically comprises a photographic medium or other material that is selectively processable to a plurality of clearly distinguishable grey scale values, either for transmitted or reflected light. The record surface area that corresponds to each scene element is subdivided into a plurality of subelements which act as code characters. The code subelements of each recorded element may differ widely in form, number, size and arrangement, according to the particular code that is selected. An essential characteristic of the code, however, is that the digital code configuration representing each numeral value produces in the record element an average optical visual grey scale value that corresponds approximately to the digital value. That correspondence may in general be direct or inverse, linear or nonlinear. In general it is not feasible, and may not even be desirable, to obtain precise and complete correspondence between the digital data and the analog data for every scene element. For example if 64 different light values are represented digitally by a 6-digit binary number, a sufficiently complete visual representation of the scene will often be obtained with a code that produces in the record a much smaller number of different average grey scale or density values, such as six or twenty, for example.

It is ordinarily advantageous to employ a binary code. Processing of the record material is then relatively simple, since only two density values are required, typically essentially black and white. For some purposes, however, it is preferable to have the greater flexibility of visual effect that is available with a code in which each code character has three or more alternative density values.

The term "density" is used in the present specification and claims in the general sense of grey scale level, rather than as a technical numerical measure of light absorption.

A further aspect of the invention provides a wider effective range of average density values in the individual record elements by using code subelements of unequal areas. With suitably coordinated code configurations, such unequal code subelement areas can also provide a scale of visual grey levels that is more suitable for visual display.

A full understanding of the invention will be had from the following description of certain illustrative manners in which it may be carried out. The particulars of that description, and of the accompanying drawings which form a part of it, are intended only as illustration and not as a limitation upon the scope of the invention, which is defined in the appended claims.

Figures 1, 1A, 2:
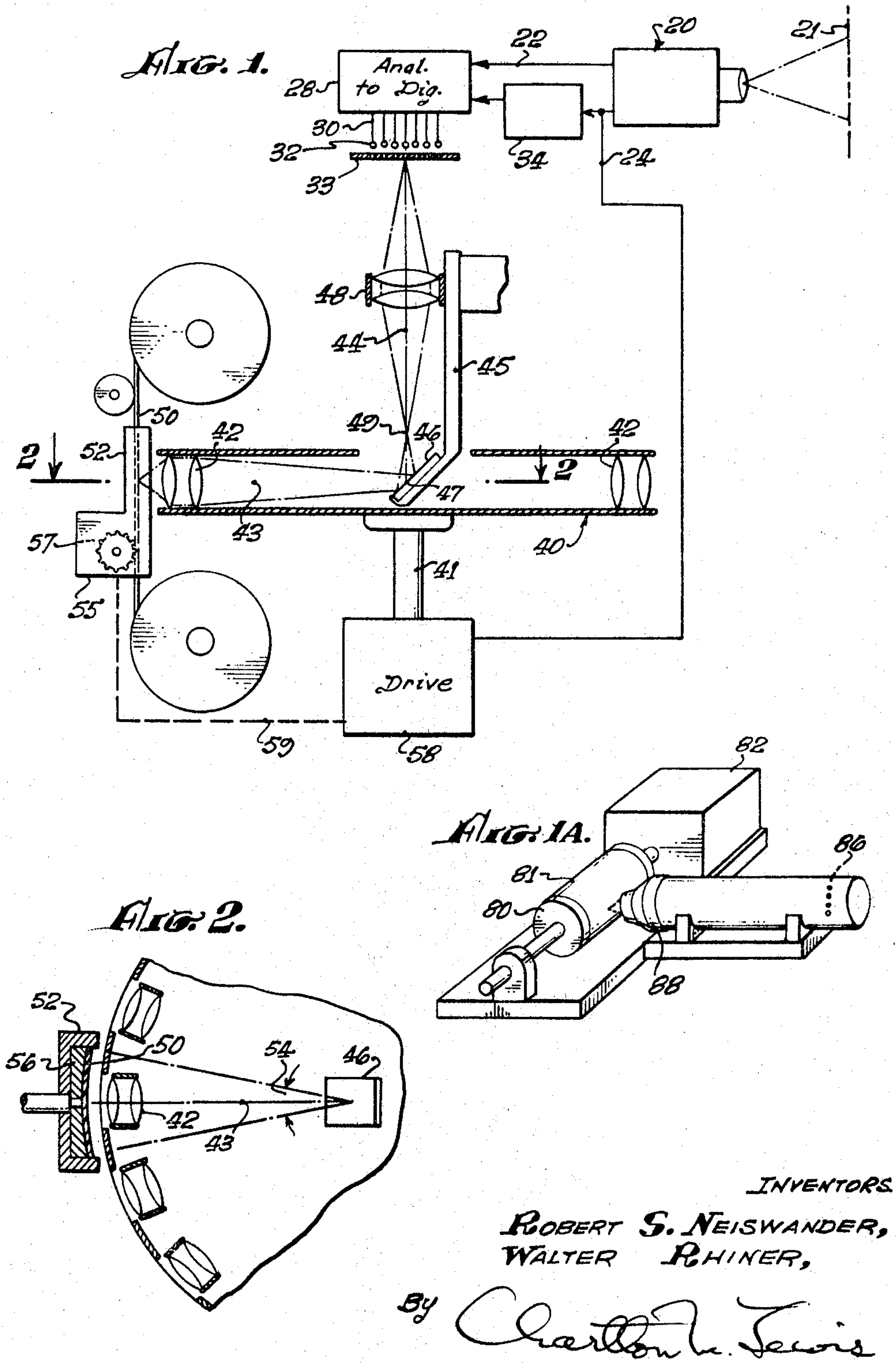
FIG. 1 is a schematic axial section representing an illustrative embodiment of a recording system in accordance with the invention.
FIG. 1A is a schematic drawing representing a modification.
FIG. 2 is a schematic fragmentary section on the line 2—2 of FIG. 1.

As represented schematically in FIGS. 1 and 2, a radiation responsive scanning device is indicated at 20 with video output on the line 22 and with line synchronizing signals supplied on the line 24. The video signal, constituting typically an analog representation of the luminosity of the scene 21, is converted to digital form by the analog-to-digital converter shown schematically at 28. Converter 28 may be of conventional type but is designed to represent a numerical value corresponding to the analog signal in terms of a special code having the characteristics to be more fully described. If scanning device 20 operates on the general principle of a television camera, for example, the scanning rate of the camera is such as to permit time for operation of converter 28. Alternatively, scanning device 20 may comprise optical means for imaging a photosensitive sensor on a single element of scene 21, with mechanical or optical means of known type for causing the imaged element to scan the scene periodically and for producing synchronizing signals on line 24 in timed relation to the scan lines. For some purposes frame scanning takes the form of continuous movement of device 20 relative to the scene, as in strip mapping techniques that are well known for aerial reconnaissance and the like.

The output from analog-to-digital converter 28 typically appears on $n$ parallel lines 30, one for each of the $n$ code elements or digits of the selected digital code, which is typically binary. Those lines 30 control the respective light sources 32, which are typically neon discharge tubes of conventional design, arranged in a single row parallel to the plane of FIG. 1. The effective area of each lamp is preferably sharply defined, as by a mask 33, which may be supplemented by ground glass or other conventional optical means. At each instant, the pattern of illuminated lamps 32 is a code representation of the digital number that correspond to the momentary analog value of the video signal, and hence represents the luminance of the scene element that is being scanned at that instant. Converter 28 is typically time controlled to produce a new code representation periodically at intervals corresponding to the scan of individual scene elements along each scanning line of scanner 20. Such control may be derived from the line sync signals on line 24, for example by suitable frequency multiplying circuits indicated schematically at 34, the multiplying factor corresponding to the selected number of scene elements per scan line.

For recording the code representations presented by lamps 32, many different types of optical and mechanical apparatus may be employed. In the illustrative embodiment of FIGS. 1 and 2, a wheel assembly 40 is mounted on the shaft 41 for continuous rotation about the axis 44. The lens systems 42, typically similar to microscope objectives, are mounted at uniform intervals on the periphery of wheel 40 with their axes 43 extending radially from a common point 47 on wheel axis 44. The mirror 46 and relay lens 48 are fixedly mounted by bracket means 45, and image the code lamps 32 at a fixed position 49 on axis 44. That image lies in a conjugate focal surface of successive ones of the objectives 42 as the latter swing through a selected active angular range of their rotary movement. The lamps 32 are thus imaged on the recording medium 50, their image sweeping across that medium in response to the lens movement.

The recording medium 50, typically a conventional high contrast motion picture film, is guided by conventional film guides 52 to receive the image from objectives 42. As each objective swings through its active angular range, indicated at 54 in FIG. 2, a greatly reduced image of code lamps 32 sweeps across the film. As the image from one objective reaches the film edge, that from another objective starts its sweep, permitting a 100% duty cycle for recording the successive code representations. Assembly 40 is driven by drive means shown schematically at 58 under control of the sync signals from line 24 at such speed that each sweep line of scanner 20 corresponds to one sweep of the code lamp images across film 50. The film is driven longitudinally by drive mechanism shown schematically at 55 with driving element shown as the sprocket 57. Film drive 55 is coordinated with optical drive 58 by suitable coupling mechanism, indicated at 59, which may be mechanical or electronic, for example. The film is moved at such speed that successive transverse sweep lines are spaced longitudinally of the film by an appropriate distance to correspond to the line spacing at scanner 20. The film drive is typically continuous, but may be stepwise if preferred, the steps being then accurately timed to coincide with the line synchronizing signals from line 24. The scale of the lamp images at the film is preferably selected so that successive image sweeps substantially adjoin, without overlap. The film may be held accurately in the cylindrically curved image surface by a conventional vacuum back 56, the vacuum being light enough to permit free longitudinal film movement.

The drive mechanism 58 of FIG. 1 may be considered, alternatively, to shift the optical assembly 40 stepwise from one element to another of the record surface in accordance with the scanning movement by scene scanning device 20. Such stepwise movement can be produced in known manner by electrical devices such as rotary solenoids, for example, which shift a drive element through a definite angle in response to each input control signal. Drive mechanisms 58 may comprise such an electrical stepping device, coupled to shaft 41 through suitable reduction gearing, so that each drive increment corresponds to the desired record element dimensions at film 50. Stepwise scanning of both the scene and the record medium has the advantage that synchronization between corresponding elements can be made more positive and reliable than is sometimes the case with continuous sweep movement. Stepwise scanning also facilitates employing record elements that vary in size along each scan line, as to correct for geometric nonlinearities in the transfer characteristic of the whole channel.

FIG. 1A represents in schematic form an alternative recording mechanism in which the record medium 81 is mounted on the drum 80 and is shifted both axially and in rotation by mechanism indicated at 82. That mechanism may, for example, be similar to that by which a typewriter platen is shifted stepwise axially for line scanning and in rotation for page scanning. When both coordinates of scan movement are produced by shifting the record medium, the optical system may be considerably simplified, typically comprising the fixedly mounted array of encoding lamps 86 and the fixed objective lens 88 which images the lamp array on the record surface.

Figure 3:
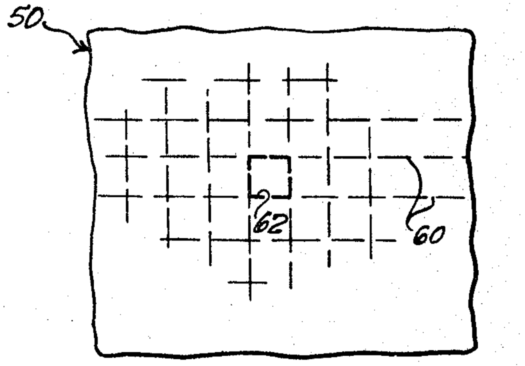
FIG. 3 is a schematic diagram representing typical division of a recording medium into record elements.

FIG. 3 represents a small portion of a typical record area, with adjoining line scanning strips 60. These strips, which are assumed horizontal for convenience of description, are made up of adjoining record elements 62, each of which corresponds to an element of the scene 21 (FIG. 1). Each record element 62 is subdivided into code subelements, with each subelement generally corresponding to a digit of the code. The number and arrangement of the code subelements thus depends upon the particular code selected.

Figure 4:
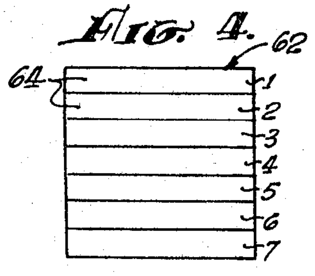
FIG. 4 is a schematic diagram representing typical code subelements within a record element.

In the illustrative code shown in FIG. 4, code subelements 64 are horizontal bars extending the full width of each record element 62. The number of bars is selected in accordance with requirements for each individual system. With seven bars, as illustratively shown, the seventh is typically employed for registration. The other six bars then provide six digits which are black-white encoded to provide a 6-digit binary number. 64 values of the scene variable can then be represented, corresponding typically to 64 grey scale values of the scene element progressing from white to black.

A special encoding system is used, in which lower numbers, say, are represented by code configurations having few black bars, and higher numbers have progressively increasing numbers of black bars. When inspected visually at a scale at which the individual code subelement bars are not resolved, each record element appears to have a grey scale level determined by the ratio of black to white bars, and since this increases approximately in proportion to the encoded value, the visual impression corresponds generally to the original scene. However, with the presently described code each scene element as portrayed on the record is capable of only seven different grey scale values, with zero to six black bars, respectively. On the other hand, the 6-digit code number representing that scene element may have 64 different values. Thus the digitally coded information is more full and precise than the analog information made available visually. The latter, however, is entirely satisfactory for many monitoring and selection purposes.

The binary code just described, with code subelements of bar form, is well adapted for the present encoding system, since the encoding lamps 32 can simply be selectively energized in the proper code configuration as their image enters each record element, and held in that condition for the time lapse corresponding to the record element scan. Alternatively, the lamps may be flashed momentarily during the scanning of each record element, and their images spread optically, as by making optical systems 42 slightly astigmatic, to fill the element width. The exposure of the record medium must be sufficient to give reasonable density of the black bars upon development, but since the recording is essentially a black and white process neither the exposure nor the development is particularly critical.

Figures 5, 7:
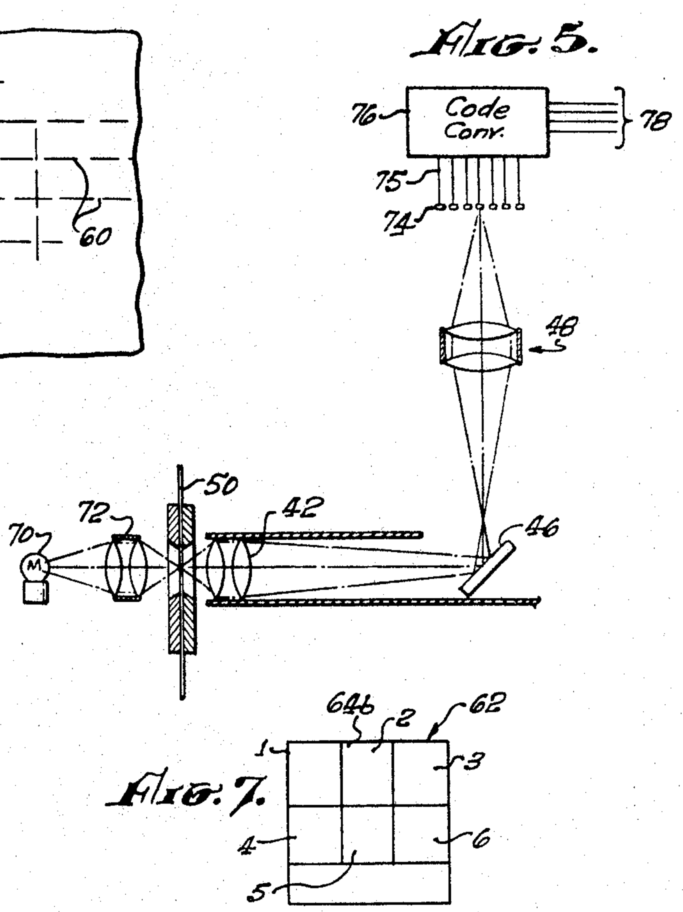
FIG. 5 is a fragmentary schematic section corresponding generally to FIG. 1 but representing a readout system.
FIGS. 6, 7 and 8 are schematic diagrams similar to FIG. 4 and representing further code subelement arrangements.

Readout from the coded record is typically accomplished with apparatus essentially similar to that shown in FIGS. 1 and 2, but modified as indicated in FIG. 5. Vacuum back 56 is replaced by a light source 70 and condenser 72 for back lighting the developed film, and the lamps 32 are replaced by the same number of similarly placed light sensors 74. The parallel outputs of those sensors on the lines 75 then comprise a binary digital code representation of the original scene data. The code representation developed directly by sensors 74 is, of course, in the special code described. That code may be converted to a conventional type of digital code, as by the converter indicated schematically at 76, with output at 78 suitable for supply to a computer, tape recorder, or other processing or storage device as required. Alternatively, the information may be converted from digital to analog form, as for producing a conventional analog reproduction of the original scene 21. It is noted that such an analog reconstitution can contain all the detail and accuracy that were originally available, without degradation by the recording and subsequent readout.

Figure 6:
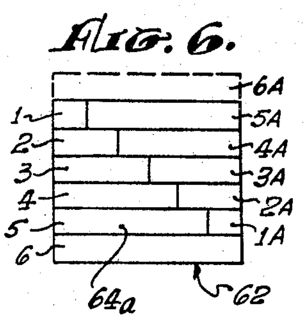

For some purposes it is desirable to provide a visual display of the numerical data represented by the digital code in more full and accurate detail than is possible with the very simple encoding system of FIG. 4. In accordance with a further aspect of the invention, that may be accomplished by providing code subelements of different area within each of the record elements. A particularly effective way of arranging such code subelements is shown in FIG. 6. That figure, like FIG. 4, represents a single record element 62 and illustrates typical subdivision of that element into a plurality of bars of different lengths, each of which may be either black or white, say, to form various binary code configurations. In FIG. 6 the bars numbered 1 to 6 constitute one set, and are seen to increase progressively in area, element 1 having length 1, element 2 length 2, etc. Whereas that increase is linear as shown, the vertical boundaries 80 may be shifted to provide a nonlinear area relation if desired. The different lengths of the respective bars 1 to 6 may be produced with the illustrative recording system of FIG. 1 by pulsing each of the lamps 32 in the same time relation to the scanning movement of scanner 40, but providing electronic timing circuitry of known type in the circuits of the respective lamps to extinguish each lamp after the time required to produce a bar of the desired length.

With the linear arrangement shown in FIG. 6, the binary number 100000 has a visual grey scale value that can be represented for the respective digits as 100000; the number 010000 has the grey value 020000; the number 000001 has the grey value 000006; and the number 010011, say, has the grey value 020056, giving a total grey value or visual density of 13. The 64 numerical values available with the 6 binary digits illustratively shown are appropriately reordered, as typically shown for the first 32 numbers in Table 1, so that each scene value, typically corresponding to scene brightness is represented by a binary number for which the code representation provides an approximately corresponding visual density. The configurations for the other 32 scene values are derivable in reverse order from those shown by interchanging 0's and 1's.

TABLE 1

| | Binary number | Visual grey value | |
|---|---|---|---|
| | | Digits | Total |
| Scene Value: | | | |
| 1 | 000000 | 000000 | 0 |
| 2 | 100000 | 100000 | 1 |
| 3 | 010000 | 020000 | 2 |
| 4 | 001000 | 003000 | 3 |
| 5 | 110000 | 120000 | 3 |
| 6 | 000100 | 000400 | 4 |
| 7 | 101000 | 103000 | 4 |
| 8 | 000010 | 000050 | 5 |
| 9 | 011000 | 023000 | 5 |
| 10 | 100100 | 100400 | 5 |
| 11 | 000001 | 000006 | 6 |
| 12 | 010100 | 020400 | 6 |
| 13 | 100010 | 100050 | 6 |
| 14 | 111000 | 123000 | 6 |
| 15 | 001100 | 003400 | 7 |
| 16 | 010010 | 020050 | 7 |
| 17 | 100001 | 100006 | 7 |
| 18 | 110100 | 120400 | 7 |
| 19 | 001010 | 003050 | 8 |
| 20 | 010001 | 020006 | 8 |
| 21 | 110010 | 120050 | 8 |
| 22 | 101100 | 103400 | 8 |
| 23 | 000110 | 000450 | 9 |
| 24 | 001001 | 003006 | 9 |
| 25 | 011100 | 023400 | 9 |
| 26 | 101010 | 103050 | 9 |
| 27 | 110001 | 120006 | 9 |
| 28 | 000101 | 000406 | 10 |
| 29 | 011010 | 023050 | 10 |
| 30 | 100110 | 100450 | 10 |
| 31 | 101001 | 103006 | 10 |
| 32 | 111100 | 123400 | 10 |

The above illustrative code will be seen to provide 22 different grey scale levels or visual densities, each of which in general may represent several different scene densities or values, as indicated in Table 2.

TABLE 2

| Record grey value | Number of scenes values represented | Record grey value | Number of scene values represented |
|---|---|---|---|
| 1 | 1 | 12 | 5 |
| 2 | 1 | 13 | 5 |
| 3 | 1 | 14 | 4 |
| 4 | 2 | 15 | 4 |
| 5 | 2 | 16 | 4 |
| 6 | 3 | 17 | 3 |
| 7 | 4 | 18 | 2 |
| 8 | 4 | 19 | 2 |
| 9 | 4 | 20 | 1 |
| 10 | 5 | 21 | 1 |
| 11 | 5 | 22 | 1 |

From Table 2 it is evident that the grey scale values of the scene are reproduced in the visual grey scale of the record with relatively high contrast near both ends of the grey scale, and relatively low contrast in the middle tones. That is a useful relation for many purposes, especially for facilitating recognition of primary features of a scene. If higher effective record contrast in the middle tones is desired, the correspondence between numerical values and actual intervals of scene density can be modified to provide fewer numerical values in the midrange and relatively more near the extremes. Such nonuniformity can be introduced, for example, by modifying the analog-to-digital converter 28 of FIG. 1 in known manner. Alternatively, it may be acceptable to reduce the number of distinct scene densities that are discriminated in the analog-to-digital conversion. Instead of 64 scene densities, 40 or 50 may be used, omitting one or more, for example, of the numerical scene densities that correspond to each of the mid-range record densities of Table 1.

A particular advantage of the type of code element arrangement illustrated by FIG. 6 is that only about half of each record element is utilized by code subelements 1 to 6. In accordance with a further aspect of the present invention, the unused part can be employed for representing another characteristic of the scene. For example, the code subelements 1 to 6 may represent the scene brightness in one region of the spectrum and the subelements 1A to 5A may then represent the scene brightness in another region of the spectrum. Thus two or more channels of information can be recorded independently on the same record area, effectively in superposition. For some purposes it will be convenient to employ fewer visual density steps for one scene variable than for the other, utilizing six digits for one and five for the other, for example, as illustrated in solid lines in FIG. 6. If the same accuracy of representation is desired for both variables, an additional code subelement 6A may be added, as indicated in dotted lines.

When multichannel recording is employed the several device 20, but supplied on separate video lines in parallel types of data are typically gathered by the some scanning to line 22 of FIG. 1. Each video signal is then converted independently to digital form in a separate converter channel similar to 28 and is employed for controlling a distinct set of lamps similar to 32. It is sometimes convenient to offset the two or more sets of lamps slightly from each other perpendicular to the plane of FIG. 1. That offset may, for example, correspond to a definite number of record elements 62 in FIG. 3. It may be compensated by inserting a suitable time difference, as by conventional electronic time delay circuit means, in the circuits for energizing the respective sets of lamps, so that the lamps of each set will be energized when their image is properly registered on the record medium.

In order to provide visual display of the respective channels of a multichannel record it is convenient to record each channel in a different color. In a two-channel system, for example, the two sets of lamps at 32 are typically of different colors, and conventional color film is used as record medium at 50. That procedure gives particularly effective results when the two sets of data represent the scene brightness in two visible wavelength regions that correspond to the colors used for the display. Even when that is not the case, for example, if the data correspond to respective infrared or ultraviolet wavelengths, or to any other pair of variables, a record display in two visually distinct colors is highly useful for such purposes as identification and selection of features of interest. If it is desired to inspect the two sets of data independently the record can be observed through suitable light filters.

Extraction of one or both sets of digital data from such a multicolor record is simplified by providing suitable color discrimination in the optical system used for readout. The beam from objectives 42A of FIG. 5, for example, is preferably split by conventional means into two beams of the respective colors used in the record, the code data being extracted separately from the two beams by two separate sets of sensors 74 and signal processing channels 76.

For some purposes it may be preferred not to use color film as record medium. If the two sets of data are recorded essentially as already described, but on black and white film and using light of any desired color, the effect of a two-color record can be obtained by observing the record, either visually or for readout, through a superposed color mask having appropriate colors over the two portions of each record element. Since that procedure requires good registration between the mask and record, it is most useful when extreme reduction of record size is not required. Independent code readout of each channel of such a record is also possible without use of color masks by scanning the record in any manner that limits each set of sensors to the appropriate areas of each record element. For example, to read the informtaion in subelements 1 to 6 of FIG. 6, the signals supplied from sensors 74 of FIG. 5 to code converter 76 can be time gated to limit the response of each sensor only to the extreme left position of each record element.

If it is required to record data as compactly as possible on a record medium without increased resolution in the optical system or in the record medium itself, the dimensions of the code subelements parallel and perpendicular to the direction of scan are preferably made more nearly equal than in the codes previously described. That may be accomplished by rearranging the code elements or characters within the record element, for example, as indicated in FIG. 7, to form a series-parallel system rather than the parallel recording and readout system already described. The wide block at the bottom of FIG. 7 may be employed for registration. The six numbered code digits **64*b* of FIG. 7 may be considered to form three sequential numbers of two digits each. Such a code can be recorded, for example, with only two lamps similar to lamps 32 of FIG. 1. Analog to digital converter 28** then typically includes means for supplying code signals to the lamps in the form of three sequential numbers each consisting of two parallel-modulated binary digits. During the scan of each record element the lamps are flashed three times in the correct configurations for the three sequential code configurations.

Alternatively, six lamps can be used, arranged in a two-dimensional block such that their optical image corresponds to the code element arrangement. Those lamps are then flashed in the appropriate code configuration only once during the scan of each record element. The same coding can then be used as in FIG. 1 with the code of FIG. 4. Since the smallest dimension that must be resolved in recording or reading the code of FIG. 7 is approximately twice as great, relative to the record element 62, it is feasible to make the record elements correspondingly smaller, provided, of course, that registration of the scanning movement is carried out with sufficient accuracy in both dimensions.

Figure 8:
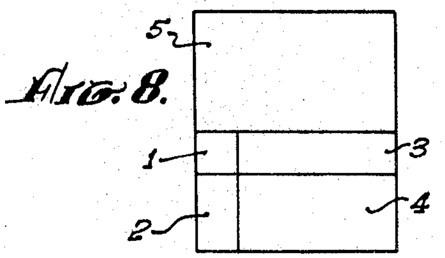

Division of the record element vertically as well as horizontally, as illustrated in FIG. 7, also provides other types of design flexibility. FIG. 8 illustrates such increased flexibility in the relative areas of the respective digits. The five digit areas of FIG. 8 are proportional to the numbers 1, 2, 4, 8 and 15. An illustrative code for use with that particular selection of code element areas is partially indicated in Table 3, the remaining code configurations following logically from those shown.

TABLE 3

| Scene value | Binary number | Visual grey value |
|---|---|---|
| 1 | 10000 | 1 |
| 2 | 01000 | 2 |
| 3 | 11000 | 3 |
| 4 | 00100 | 4 |
| 5 | 10100 | 5 |
| 6 | 01100 | 6 |
| 7 | 11100 | 7 |
| 8 | 00010 | 8 |
| 14 | 01110 | 14 |
| 15 | 11110 | 15 |
| 16 | 00001 | 15 |
| 17 | 10001 | 16 |
| 18 | 01001 | 17 |

With such arrangements it is possible to provide visually distinct grey scale densities to correspond to substantially all the digital values portrayed by the code, or, alternatively, to provide a wide variety of functional relations between the numerical values and the visual densities of the code configurations that represent them.

Although the processing of the record medium is least critical for a binary code with only two density values, further flexibility in selection of the code is obtainable within the scope of the invention by using code characters having three or more values. Each code subelement of the record then may take on any one of three or more density values. The two extreme values are normally selected as essentially white and black, but the intermediate density value or values can be selected arbitrarily to provide a desired relationship between average visual grey level of the various code configurations and the numerical values they represent. For recording such a multivalued code, lamps 32 of FIG. 1, for example, can be energized to the required intermediate brightness by including suitable voltage or current limiting circuitry in the analog-to-digital converter represented at 28.

Table 4 illustrates the flexibility of such codes having multivalued digits, showing a relatively simple 2-digit, 4-valued code in which the transmission or reflectivity of the four alternative digit values are arbitrarily selected as 0, 1, 2 and 4.

TABLE 4

| Scene value | Code number | Visual grey value | Scene value | Code number | Visual grey value |
|---|---|---|---|---|---|
| 1 | 0 0 | 0 | 9 | 2 2 | 4 |
| 2 | 1 0 | 1 | 10 | 4 0 | 4 |
| 3 | 0 1 | 1 | 11 | 0 4 | 4 |
| 4 | 1 1 | 2 | 12 | 4 1 | 5 |
| 5 | 2 0 | 2 | 13 | 1 4 | 5 |
| 6 | 0 2 | 2 | 14 | 4 2 | 6 |
| 7 | 2 1 | 3 | 15 | 2 4 | 6 |
| 8 | 1 2 | 3 | 16 | 4 4 | 8 |

That code, as shown in Table 4, provides digital code representations of 16 different scene values, while the visual display utilizes 8 different grey values which correspond to the scene values in a relatively uniform manner. That correspondence is made even more uniform if the first and last entries in the table are omitted. The code then provides six visual densities each of which represents either two or three of the 14 different scene values. It will be understood that such multivalued digital codes can employ code subelements of different areas, as illustrated for binary codes in FIGS. 6 and 8. A wide variety of specific codes is thereby made available, from which a grey scale display having the desired characteristics may be selected.

We claim:

1. A system for recording a plurality of numerical values that correspond to respective elements of a scene, comprising in combination, means for scanning the scene to sense the numerical value associated with each element thereof, means for producing a digital code representation of each said numerical value, means for recording the digital code representation of each numerical value on a record medium at a surface element of the medium that corresponds spatially to the scene element associated with that value, said digital code being such that each code representation produces at said record element an average visual density that corresponds approximately to said numerical value.

2. A system as defined in claim 1, and in which said recording means comprise optical means for projecting onto the record medium a plurality of light images corresponding to said digital code representation, and means for causing said light images to scan the record surface in correspondance with said scanning of the scene, said record medium having a photosensitive surface.

3. A system as defined in claim 2, and in which each recorded code representation comprises a plurality of code elements within a surface element of the medium, the code elements being elongated in the direction of said scanning of the record surface and being mutually offset transversely of that direction.

4. A system as defined in claim 3, and in which the lengths of the respective code elements of each recorded code representation include a plurality of different values.

5. A system as defined in claim 2, and in which said means for causing the light images to scan the record surface includes means for arresting the movement of the scanning images in alinement with each successive record element that is scanned.

6. A system for recording a plurality of numerical values associated with respective elements of a scene, comprising in combination means for supporting a photosensitive record medium having surface elements that correspond spatially to the respective scene elements, means for producing a code representation of any one of said numerical values in accordance with a predetermined digital code, means for projecting an optical image of said code representation onto the record medium to expose the same, means for causing the image to scan successively the surface elements of the record medium, and means for varying the code representation in accordance with said scanning movement so that the optical image projected onto each elementary area of the record medium is a code representation of the numerical value associated with the corresponding scene element, said digital code being such that exposure of each record element to the code representation image produces at said record element a latent image yielding on development an average visual density that corresponds approximately to the numerical value represented.

7. A system as defined in claim 6, and in which said digital code is a binary code, said optical image of a code representation comprising a plurality of elementary image areas each capable of two code conditions which are relatively bright and dark, respectively, the bright image areas producing essentially complete exposure of the record medium and the dark image areas producing essentially zero exposure of the record medium.

8. A system as defined in claim 6, and in which said digital code is a multivalued code, said optical image of a code representation comprising a plurality of different degrees of brightness, the brightest and darkest image areas producing essentially complete exposure and essentially zero exposure, respectively, of the record medium.

9. A record that includes a digital code representation of a plurality of numerical values and that displays visually the approximate distribution of the encoded numerical values, comprising the combination of
record medium having a surface comprising elementary surface areas,
equal pluralities of subelements forming similar preselected patterns within the respective elementary surface areas and constituting code characters,
the subelements each being capable of a plurality of distinct code conditions that produce different visual densities, each code configuration of subelement conditions producing a definite average visual density for the entire record element,
each distinct numerical value being represented by a unique configuration of code conditions for the subelements of a record element, code configurations that have a common average visual density corresponding to consecutive numerical values, and pairs of code configurations of which the second has a greater average visual density than the first corresponding to respective pairs of numerical values of which the second differs from the first in a common sense.

10. The method of recording a plurality of numerical values that correspond to respective elements of a scene, said method comprising in combination the steps of
establishing a one-to-one correspondence between the scene elements and respective elementary areas of a two-dimensional record medium such that the record elements and the respective corresponding scene elements have similar spatial relationships,
selecting a digital code for representing said numerical values such that each code configuration has a definite visual density, the correspondence between the code configurations and the numerical values being such that the visual density of each code configuration corresponds approximately to the numerical value represented by that code configuration,
and recording in each elementary area of the record medium the numerical value for the corresponding scene element in accordance with said selected code.

11. The method defined in claim 10, and in which the code configurations of the selected digital code comprise a plurality of code subelements within each elementary area of the record medium, said code subelements having a plurality of different areas.

12. The method defined in claim 10, and in which the code configurations of the selected digital code comprise code elements having predetermined respective areas and having two alternative visual densities corresponding essentially to white and black, respectively,
the ratio of the total white area to the total black area within each code configuration corresponding approximately to the numerical value represented by that code configuration.

13. The method of recording numerical values that represent a characteristic of a scene at respective elementary scene areas, said method comprising the combination of providing a recording medium having a two dimensional array of record elements corresponding spatially to the respective scene elements, each element of the medium comprising a plurality of subelements that are spatially distinguishable, each subelement being processable to a selected one of a plurality of different density values,
and processing the subelements of each record element to respective density values that represent the numerical value for the corresponding scene element in accordance with a code such that the visual effect of the density values averaged over each code configuration of subelements corresponds approximately to the numerical value represented by the code configuration.

14. The method defined in claim 13, and wherein said plurality of subelement density values consists of two density values corresponding essentially to white and black, respectively.

15. The method defined in claim 13, and wherein the subelements of each record element include subelements having a plurality of different areas.

16. The method of recording numerical values that represent first and second characteristics of a scene at respective elementary scene areas, comprising in combination
providing a record medium having a two dimensional array of record element corresponding spatially to the respective elementary areas of the scene,
recording in one portion of each record element a first code configuration representing the numerical value associated with one characteristic of the scene at the corresponding elementary scene area,
and recording in another portion of each record element a second code configuration representing the numerical value associated with the other characteristic of the scene at the corresponding elementary scene area.

17. The method defined in claim 16, and in which the first and second code configurations are recorded on the record medium in respective different colors.

18. The method defined in claim 17, and in which each said code configuration produces at the record element an average visual density, for light of said color, that corresponds approximately to the numerical value represented.

19. The method defined in claim 16, and in which each code configuration in a record element comprises a plurality of parallel strips of different lengths,
the strips of one code configuration being alined with respective strips of the other code configuration so that each pair of alined strips has approximately the same total length.

References Cited

UNITED STATES PATENTS

| | | | |
|---|---|---|---|
| 2,540,105 | 2/1951 | Dunbar et al. | |
| 2,968,793 | 1/1961 | Bellamy. | |
| 3,071,762 | 1/1963 | Morgan. | |
| 3,072,889 | 1/1963 | Willcox. | |
| 3,113,989 | 12/1963 | Gray et al. | |
| 3,130,305 | 4/1964 | Sutherland. | |
| 3,231,884 | 1/1966 | Higgins | 340—347 |

RALPH G. NILSON, Primary Examiner

C. M. LEEDOM, Assistant Examiner

U.S. Cl. X.R.

179—100.3; 250—219; 340—173, 347; 346—30